United States Patent
Miki

(10) Patent No.: US 12,355,065 B2
(45) Date of Patent: *Jul. 8, 2025

(54) CATHODE, ALL-SOLID-STATE BATTERY AND METHODS FOR PRODUCING THEM

(71) Applicant: TOYOTA JIDOSHA KABUSHIKI KAISHA, Toyota (JP)

(72) Inventor: Nariaki Miki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,482

(22) Filed: Jan. 19, 2024

(65) Prior Publication Data

US 2025/0046789 A1   Feb. 6, 2025

Related U.S. Application Data

(60) Continuation of application No. 17/669,728, filed on Feb. 11, 2022, which is a division of application No. 16/407,352, filed on May 9, 2019, now abandoned.

(30) Foreign Application Priority Data

May 29, 2018   (JP) .................................. 2018-102285

(51) Int. Cl.
   *H01M 4/36*   (2006.01)
   *H01M 4/62*   (2006.01)
   (Continued)

(52) U.S. Cl.
   CPC ............. *H01M 4/362* (2013.01); *H01M 4/62* (2013.01); *H01M 10/0562* (2013.01);
   (Continued)

(58) Field of Classification Search
   CPC .... H01M 4/362; H01M 4/62; H01M 10/0562; H01M 10/0585; H01M 2004/028;
   (Continued)

(56) References Cited

U.S. PATENT DOCUMENTS 9,887,417 B2 *   2/2018   Miki ................... H01M 10/058
9,941,514 B2 *   4/2018   Suzuki ................. H01M 4/043
(Continued)

FOREIGN PATENT DOCUMENTS

CN   1322026 A    11/2001
CN   105493318 A   4/2016
(Continued)

OTHER PUBLICATIONS

U.S. Appl. No. 16/407,311, filed May 9, 2019 in the name of Nariaki Miki.
(Continued)

*Primary Examiner* — Abdullah A Riyami
*Assistant Examiner* — Nader J Alhawamdeh
(74) *Attorney, Agent, or Firm* — Oliff PLC

(57) ABSTRACT

Provided is a cathode that is configured to decrease battery resistance when it is used in an all-solid-state battery, and a method for producing the cathode. Disclosed is a cathode comprising a cathode layer for all-solid-state batteries, wherein the cathode layer contains cathode active material particles and solid electrolyte particles; wherein at least one of the cathode active material particles and the solid electrolyte particles contain a phosphorus element; and wherein, in a photoelectron spectrum by X-ray photoelectron spectroscopy measurement of the cathode layer, a P peak intensity ratio (A/B), which is derived from the phosphorus element, of a signal intensity A at a binding energy of 131.6 eV to a signal intensity B at a binding energy of 133.1 eV, is larger than 0.58.

4 Claims, 1 Drawing Sheet

(51) Int. Cl.
  *H01M 10/0562* (2010.01)
  *H01M 10/0585* (2010.01)
  *H01M 4/02* (2006.01)

(52) U.S. Cl.
  CPC .. *H01M 10/0585* (2013.01); *H01M 2004/028* (2013.01); *H01M 2300/0068* (2013.01); *H01M 2300/0071* (2013.01)

(58) Field of Classification Search
  CPC . H01M 2300/0068; H01M 2300/0071; H01M 4/131; H01M 4/136; H01M 4/1391; H01M 4/1397; H01M 4/5805; H01M 4/485; H01M 4/505; H01M 4/525; H01M 4/5825; H01M 10/0525; H01M 10/058; H01M 4/13; H01M 4/139; H01M 4/366; H01M 10/052; H01M 10/0565; Y02E 60/10; Y02P 70/50
  See application file for complete search history.

(56) References Cited

U.S. PATENT DOCUMENTS

| | | | |
|---|---|---|---|
| 10,056,607 B2 * | 8/2018 | Miki | H01M 4/366 |
| 10,243,209 B2 * | 3/2019 | Miki | H01M 10/0525 |
| 10,305,096 B2 * | 5/2019 | Miki | H01M 4/505 |
| 2002/0031703 A1 | 3/2002 | Kameyama et al. | |
| 2005/0153210 A1 * | 7/2005 | Kameyama | H01M 4/505 |
| | | | 429/185 |
| 2009/0081554 A1 | 3/2009 | Takada et al. | |
| 2010/0273062 A1 * | 10/2010 | Tsuchida | H01M 10/0562 |
| | | | 429/304 |
| 2012/0028128 A1 | 2/2012 | Seino et al. | |
| 2014/0079873 A1 * | 3/2014 | Miki | H01M 4/0402 |
| | | | 427/58 |
| 2014/0127579 A1 | 5/2014 | Yoshida et al. | |
| 2014/0302229 A1 | 10/2014 | Miki | |
| 2015/0024280 A1 * | 1/2015 | Uchiyama | H01M 10/052 |
| | | | 429/231.5 |
| 2015/0096169 A1 | 4/2015 | Hasegawa et al. | |
| 2015/0171463 A1 | 6/2015 | Liang et al. | |
| 2015/0287985 A1 * | 10/2015 | Miki | H01M 4/366 |
| | | | 429/231.1 |
| 2016/0028107 A1 | 1/2016 | Kubo et al. | |
| 2016/0043391 A1 | 2/2016 | Nagatomi | |
| 2016/0211519 A1 * | 7/2016 | Uchiyama | H01M 4/0404 |
| 2016/0268595 A1 | 9/2016 | Miki | |
| 2017/0077489 A1 | 3/2017 | Uchiyama | |
| 2018/0198169 A1 | 7/2018 | Fukui et al. | |
| 2018/0219229 A1 | 8/2018 | Miki | |
| 2021/0091376 A1 * | 3/2021 | Miki | H01M 4/5815 |
| 2022/0166002 A1 * | 5/2022 | Miki | H01M 4/525 |

FOREIGN PATENT DOCUMENTS

| | | |
|---|---|---|
| DE | 10 2016 102 947 A1 | 9/2016 |
| EP | 2609652 A2 | 7/2013 |
| EP | 2623461 A1 | 8/2013 |
| EP | 2 609 652 B1 | 6/2015 |
| JP | H10-149832 A | 6/1998 |
| JP | 2009-164059 A | 7/2009 |
| JP | 2010-067499 A | 3/2010 |
| JP | 2012-074240 A | 4/2012 |
| JP | 2013-164942 A | 8/2013 |
| JP | 2015-201252 A | 11/2015 |
| JP | 2016-170973 A | 9/2016 |
| JP | 2017-059303 A | 3/2017 |
| JP | 2018-125214 A | 8/2018 |
| JP | 2019-207793 A | 12/2019 |
| WO | 2007/004590 A1 | 1/2007 |
| WO | 2012/026561 A2 | 3/2012 |

OTHER PUBLICATIONS

Mar. 5, 2020 Office Action issued in U.S. Appl. No. 16/407,311.
Feb. 27, 2020 Office Action issued in U.S. Appl. No. 15/864,182.
Aug. 5, 2020 Office Action issued in U.S. Appl. No. 15/864,182.
Aug. 6, 2020 Office Action issued in U.S. Appl. No. 16/407,311.
Jan. 15, 2021 Office Action in U.S. Appl. No. 15/864,182.
Jun. 28, 2021 Office Action issued in U.S. Appl. No. 15/864,182.
Oct. 4, 2021 Office Action issued in U.S. Appl. No. 15/864,182.
Feb. 9, 2022 Office Action issued in U.S. Appl. No. 15/864,182.
Feb. 2, 2022 Office Action issued in U.S. Appl. No. 17/112,360.
Jul. 7, 2022 Office Action issued in U.S. Appl. No. 17/112,360.
Jan. 27, 2021 Office Action issued in U.S. Appl. No. 16/407,352.
Jul. 12, 2021 Office Action issued in U.S. Appl. No. 16/407,352.
Nov. 16, 2021 Office Action issued in U.S. Appl. No. 16/407,352.
Dec. 4, 2024 Office Action issued in U.S. Appl. No. 17/669,728.
Mar. 17, 2025 Notice of Allowance issued in U.S. Appl. No. 17/669,728.

* cited by examiner

CATHODE, ALL-SOLID-STATE BATTERY AND METHODS FOR PRODUCING THEM

CROSS REFERENCE TO RELATED APPLICATION

This is a continuation application of U.S. application Ser. No. 17/669,728, filed Feb. 11, 2022, which is a divisional application of U.S. application Ser. No. 16/407,352, filed May 9, 2019, the contents of which are incorporated herein by reference.

TECHNICAL FIELD

The disclosure relates to a cathode, an all-solid-state battery and methods for producing them.

BACKGROUND

In recent years, with the rapid spread of IT and communication devices such as personal computers, camcorders and cellular phones, great importance has been attached to the development of batteries that can be used as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

Patent Literature 1 discloses that composite active material particles are obtained by coating the surface of a cathode active material that is used in all-solid-state lithium ion batteries, with a lithium ion conducting oxide.

Patent Literature 1: International Publication No. WO2007/004590

Conventional all-solid-state batteries cannot be said to have sufficient performance, since the battery resistance of them remains high.

SUMMARY

In light of the above circumstance, an object of the disclosed embodiments is to provide a cathode that is configured to decrease battery resistance when it is used in an all-solid-state battery, and a method for producing the cathode.

In a first embodiment, there is provided a cathode comprising a cathode layer for all-solid-state batteries,
  wherein the cathode layer contains cathode active material particles and solid electrolyte particles;
  wherein at least one of the cathode active material particles and the solid electrolyte particles contain a phosphorus element; and
  wherein, in a photoelectron spectrum by X-ray photoelectron spectroscopy measurement of the cathode layer, a P peak intensity ratio (A/B), which is derived from the phosphorus element, of a signal intensity A at a binding energy of 131.6 eV to a signal intensity B at a binding energy of 133.1 eV, is larger than 0.58.

The cathode layer may contain composite active material particles comprising the cathode active material particles and a lithium ion conducting oxide, the lithium ion conducting oxide coating at least part of the surface of the cathode active material particles.

The lithium ion conducting oxide may be at least one selected from the group consisting of lithium niobate, lithium titanate, lithium lanthanum zirconate, lithium tantalate and lithium tungstate.

The solid electrolyte particles may be sulfide-based solid electrolyte particles.

A moisture content of the cathode active material particles may be 70 ppm or less.

In another embodiment, there is provided an all-solid-state battery comprising:
  a cathode containing a cathode layer,
  an anode containing an anode layer, and
  a solid electrolyte layer disposed between the cathode layer and the anode layer,
  wherein the cathode is the above-described cathode.

In another embodiment, there is provided a method for producing a cathode comprising a cathode layer for all-solid-state batteries, the method comprising:
  preparing cathode active material particles;
  vacuum-drying the cathode active material particles at a temperature of 120° C. or more and 300° C. or less for one hour or more;
  mixing the cathode active material particles with solid electrolyte particles to obtain a cathode mix; and
  forming the cathode mix to obtain the cathode layer,
  wherein at least one of the cathode active material particles and the solid electrolyte particles contain a phosphorus element, and
  wherein, in a photoelectron spectrum by a X-ray photoelectron spectroscopy measurement of the cathode layer, a P peak intensity ratio (A/B), which is derived from the phosphorus element, of a signal intensity A at a binding energy of 131.6 eV to a signal intensity B at a binding energy of 133.1 eV, is larger than 0.58.

In the preparing, composite active material particles comprising the cathode active material particles and a lithium ion conducting oxide, the lithium ion conducting oxide coating at least part of the surface of the cathode active material particles, may be prepared.

In the preparing, a precursor of the composite active material particles may be obtained by drying, on the surface of the cathode active material particles, a peroxo complex aqueous solution containing an element that will compose the lithium ion conducting oxide, and the composite active material particles may be obtained by sintering the precursor.

The solid electrolyte particles may be sulfide-based solid electrolyte particles.

In another embodiment, there is provided a method for producing an all-solid-state battery comprising:
  a cathode comprising a cathode layer,
  an anode comprising an anode layer, and
  a solid electrolyte layer disposed between the cathode layer and the anode layer,
  wherein the cathode is a cathode produced by the above-described production method.

An all-solid-state battery having low battery resistance can be obtained by using the cathode of the disclosed embodiments in an all-solid-state battery.

BRIEF DESCRIPTION OF THE DRAWINGS

In the accompanying drawings.

DETAILED DESCRIPTION

Figure 1:
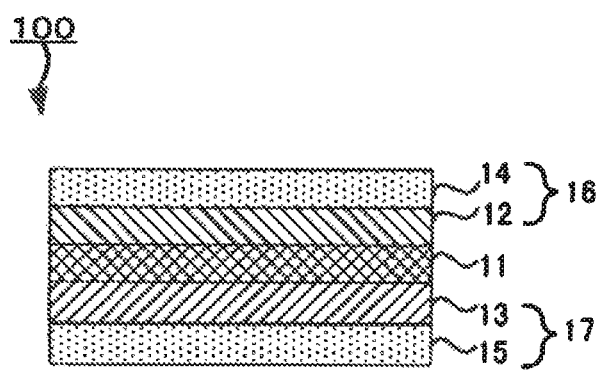
FIG. 1 is a schematic sectional view of an example of the all-solid-state battery of the disclosed embodiments.

The cathode according to the disclosed embodiments is a cathode comprising a cathode layer for all-solid-state batteries,

- wherein the cathode layer contains cathode active material particles and solid electrolyte particles;
- wherein at least one of the cathode active material particles and the solid electrolyte particles contain a phosphorus element; and
- wherein, in a photoelectron spectrum by X-ray photoelectron spectroscopy measurement of the cathode layer, a P peak intensity ratio (A/B), which is derived from the phosphorus element, of a signal intensity A at a binding energy of 131.6 eV to a signal intensity B at a binding energy of 133.1 eV, is larger than 0.58.

It was thought that a factor that increases the battery resistance of an all-solid-state battery is oxidation of the cathode active material particles contained in the cathode layer and/or oxidation of the solid electrolyte particles. Then, the cathode that can decrease the battery resistance of an all-solid-state battery, was found by focusing on the state of the phosphorus element contained in the cathode active material particles in the cathode layer and/or the phosphorus element contained in the solid electrolyte particles.

1. Cathode

The cathode comprises at least the cathode layer. Also, the cathode may comprise a cathode current collector that is electrically connected to the cathode layer.

The cathode layer contains cathode active material particles and solid electrolyte particles. At least one of the cathode active material particles and the solid electrolyte particles contain a phosphorus element, and the solid electrolyte particles may contain a phosphorus element.

The cathode layer may contain an electroconductive material and/or a binder as optional components.

[Cathode Active Material Particles]

The type of the cathode active material particles is not particularly limited. The cathode active material particles can be any type of particles composed of a material that is usable as an active material for all-solid-state batteries. When an all-solid-state battery is a lithium ion battery, as the material for the cathode active material particles, examples include, but are not limited to, $LiCoO_2$, $LiNi_xCo_{1-x}O_2$ (0<x<1), $LiNi_{1/3}Co_{1/3}Mn_{1/3}O_2$, $LiMnO_2$, different element-substituted Li—Mn spinels (such as $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$ and $LiMn_{1.5}Zn_{0.5}O_4$), lithium titanates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_3$), $TiS_2$, LiCoN, Si, $SiO_2$, $Li_2SiO_3$, $Li_4SiO_4$, lithium alloys (such as LiSn, LiSi, LiAl, LiGe, LiSb and LiP), and lithium storage intermetallic compounds (such as $Mg_2Sn$, $Mg_2Ge$, $Mg_2Sb$ and $Cu_3Sb$).

The cathode active material particles may be particles of a lithium-containing composite oxide selected from $LiCoO_2$, $LiNi_xCo_{1-x}O_2$ (0<x<1), $LiNi_{1/3}Co_{1/3}Mn_{1/3}O_2$, $LiMnO_2$, different element-substituted Li—Mn spinels and lithium metal phosphates.

The form of the cathode active material particles is not particularly limited. The primary particle diameter of the cathode active material particles may be 1 nm or more and 100 μm or less. The lower limit of the primary particle diameter may be 10 nm or more, may be 100 nm or more, or may be 500 nm or more. The upper limit of the primary particle diameter may be 30 μm or less, or may be 3 μm or less. The cathode active material particles may be secondary particles formed by aggregation of the primary particles.

[Composite Active Material Particles]

In the cathode layer, the composite active material particles may be contained as a cathode active material, from the point of view that formation of a resistive layer by reaction between the cathode active material particles and the solid electrolyte particles, can be suppressed. In the disclosed embodiments, the given peak intensity ratio, which is obtained by XPS measurement of the cathode layer, is determined as a measure to judge whether the cathode active material particles contained in the cathode layer and/or the solid electrolyte particles are kept in an unoxidized state or not. Accordingly, even if the cathode active material contained in the cathode layer is the composite active material particles, it does not interfere with the calculation of the peak intensity ratio of the cathode layer.

The composite active material particles comprise the cathode active material particles and a coating layer coating at least part of the surface of the cathode active material particles and containing the lithium ion conducting oxide.

The content of the composite active material particles in the cathode layer is not particularly limited. For example, it may be 40 mass % or more and 99 mass % or less.

The method for coating the surface of the cathode active material particles with the lithium ion conducting oxide, is not particularly limited. As the method, examples include, but are not limited to, a sputtering method, a sol-gel method, an electrostatic spraying method, a ball milling method and the following method: in the air environment, the cathode active material particles are coated with the lithium ion conducting oxide by use of a tumbling/fluidizing coating device (manufactured by Powrex Corporation), and the coated particles are sintered in the air environment.

[Lithium Ion Conducting Oxide]

The lithium ion conducting oxide has lithium ion conductivity and functions as a protection material for suppressing reaction between the cathode active material particles and the below-described solid electrolyte particles. That is, the lithium ion conducting oxide is a material having lithium ion conductivity and, compared to the cathode active material particles, relatively low reactivity to the solid electrolyte particles. As long as the lithium ion conducting oxide has such a function, desired effects can be exerted regardless of the type of the lithium ion conducting oxide.

As the lithium ion conducting oxide, examples include, but are not limited to, a composite oxide containing a lithium element and a metal element. More specifically, examples include, but are not limited to, lithium niobate, lithium titanate, lithium lanthanum zirconate, lithium tantalate and lithium tungstate. Of them, the lithium ion conducting oxide may be lithium niobate, from the point of view that formation of a resistive layer by reaction between the cathode active material particles and the solid electrolyte particles, can be suppressed.

For the composite active material particles, the content of such a lithium ion conducting oxide in the coating layer of the lithium ion conducting oxide, may be 90 mass % or more. The upper limit of the content is not particularly limited. For example, the upper limit is 100 mass % or less.

The thickness of the coating layer is not particularly limited. From the viewpoint of decreasing battery resistance, the thickness may be 3 nm or more and 100 nm or less.

[Moisture Content]

The moisture content of the cathode active material particles may be less than 402 ppm, may be 310 ppm or less, may be 119 ppm or less, or may be 70 ppm or less. By decreasing the moisture content of the particles to such a very low level, when the cathode is used in an all-solid-state battery, the below-described solid electrolyte particles can be suppressed from being deteriorated by the moisture contained in the cathode active material particles, and the solid electrolyte particles can keep high conductivity.

[Solid Electrolyte Particles]

The solid electrolyte particles may be particles composed of a solid electrolyte such as an oxide-based solid electrolyte and a sulfide-based solid electrolyte. The solid electrolyte may be a sulfide-based solid electrolyte. Also, the solid electrolyte particles may be sulfide-based solid electrolyte particles.

As the sulfide-based solid electrolyte, examples include, but are not limited to, $Li_2S$—$SiS_2$, $LiI$—$Li_2S$—$SiS_2$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, $Li_2S$—$P_2S_5$ and $Li_3PS_4$.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (LiPON).

As the solid electrolyte, one or more kinds of solid electrolytes may be used.

The solid electrolyte may be amorphous, crystalline or glass ceramic.

The content of the solid electrolyte particles in the cathode layer is not particularly limited.

[Other Components]

As the electroconductive material, examples include, but are not limited to, carbonaceous materials such as vapor-grown carbon fiber, acetylene black (AB), Ketjen Black (KB), carbon nanotube (CNT) and carbon nanofiber, and metal materials that are resistant to the environment where the all-solid-state battery is used. The content of the electroconductive material in the cathode layer is not particularly limited.

As the binder, examples include, but are not limited to, acrylonitrile-butadiene rubber (ABR), butadiene rubber (BR), polyvinylidene fluoride (PVdF) and styrene-butadiene rubber (SBR). The content of the binder in the cathode layer is not particularly limited.

The thickness of the cathode layer is not particularly limited. It can be appropriately determined depending on desired performance.

[Cathode Current Collector]

As the cathode current collector, a conventionally-known metal that is usable as a current collector in all-solid-state batteries, can be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the cathode current collector is not particularly limited. As the form, examples include, but are not limited to, various kinds of forms such as a foil form and a mesh form.

The whole form of the cathode is not particularly limited. It may be a sheet form. In this case, the whole thickness of the cathode is not particularly limited. It can be determined depending on desired performance.

The method for forming the cathode layer is not particularly limited. As the method, examples include, but are not limited to, pressure-forming a powdered cathode mix that contains the cathode active material particles, the solid electrolyte particles and, as needed, other components.

[XPS Measurement of Cathode Layer]

For the cathode of the disclosed embodiments, in a photoelectron spectrum by X-ray photoelectron spectroscopy measurement of the cathode layer, the P peak intensity ratio (A/B), which is derived from the phosphorus element, of the signal intensity A at a binding energy of 131.6 eV to the signal intensity B at a binding energy of 133.1 eV, is larger than 0.58.

The binding energy (131.6 eV) of the signal intensity A indicates, for example, the energy of a P—S bond between the phosphorus element and a sulfur element.

The binding energy (133.1 eV) of the signal intensity B indicates, for example, the binding energy between an oxygen element and the phosphorus element while the phosphorus element is in an oxidized state, such as Pox.

Accordingly, the ratio (A/B) is a measure to judge whether the phosphorus element is kept in an unoxidized state (e.g., P—S bond) or not.

The P peak intensity ratio (A/B) may be larger than 0.58. When the P peak intensity ratio (A/B) is larger than 0.58, it means that the phosphorus element is not oxidized and the cathode layer is not deteriorated. Accordingly, the upper limit of the P peak intensity ratio (A/B) is not particularly limited. The upper limit may be 2.0 or less, or it may be 1.55 or less.

The timing for the XPS measurement of the cathode layer is not particularly limited.

The XPS measurement of the cathode layer may be carried out by the following method, for example. When the XPS measurement of the cathode layer is carried out after the all-solid-state battery is initially discharged, the initially charged all-solid-state battery is disassembled; the cathode layer is taken out; and the XPS measurement is directly carried out on the cathode layer. Then, the peak intensity ratio can be calculated from a photoelectron spectrum thus obtained.

Also, the XPS measurement of the cathode layer may be carried out as follows: the all-solid-state battery is disassembled; the cathode is taken out; the cathode is cut and/or polished as it is without removing the current collector from the cathode, or the cathode is freeze-fractured. Also, the cathode layer may be made into a powder before the XPS measurement.

2. All-Solid-State Battery

FIG. 1 is a schematic sectional view of an example of the all-solid-state battery of the disclosed embodiments.

As shown in FIG. 1, an all-solid-state battery 100 comprises: a cathode 16 comprising a cathode layer 12 and a cathode current collector 14, an anode 17 comprising an anode layer 13 and an anode current collector 15, and a solid electrolyte layer 11 disposed between the cathode 16 and the anode 17.

[Cathode]

The structure of the cathode is as described above.

[Solid Electrolyte Layer]

The solid electrolyte layer contains a solid electrolyte.

As the solid electrolyte contained in the solid electrolyte layer, a conventionally-known solid electrolyte that is usable in all-solid-state batteries, can be appropriately used. As such a solid electrolyte, examples include, but are not limited to, a solid electrolyte that can be incorporated in the cathode or in the below-described anode.

As the solid electrolyte, one or more kinds of solid electrolytes may be used. In the case of using two or more kinds of solid electrolytes, they may be mixed together, or they may be formed into layers to obtain a multi-layered structure.

The proportion of the solid electrolyte in the solid electrolyte layer is not particularly limited. For example, it may be 50 mass % or more, may be in a range of 60 mass % or more and 100 mass % or less, may be in a range of 70 mass % or more and 100 mass % or less, or may be 100 mass %.

From the viewpoint of exerting plasticity, etc., a binder for binding solid electrolyte particles can be incorporated in the solid electrolyte layer. As the binder, examples include, but are not limited to, a binder that can be incorporated in the cathode or in the below-described anode. However, the content of the binder in the solid electrolyte layer may be 5 mass % or less, from the viewpoint of preventing excessive aggregation of the solid electrolyte and forming the solid electrolyte layer in which the solid electrolyte is uniformly dispersed, for the purpose of easily achieving high power output.

The form of the solid electrolyte layer is not particularly limited. It may be a sheet form. In this case, the thickness of the solid electrolyte layer is not particularly limited. It can be determined depending on desired performance. It is generally 0.1 µm or more and 1 mm or less.

As the method for forming the solid electrolyte layer, examples include, but are not limited to, pressure-forming a powdered solid electrolyte material that contains the solid electrolyte and, as needed, other components. In the case of pressure-forming the powdered solid electrolyte material, generally, a press pressure of about 1 MPa or more and about 400 MPa or less is applied.

[Anode]

The anode comprises an anode layer. As needed, the anode may comprise an anode current collector that is in contact with the anode layer.

The anode layer contains an anode active material. The anode layer may contain a solid electrolyte, a binder, an electroconductive material and so on as optional components.

As the anode active material, a conventionally-known material can be used. As the anode active material, examples include, but are not limited to, a Li metal, carbon, Si, a Si alloy and $Li_4Ti_5O_{12}$ (LTO).

As the Si alloy, examples include, but are not limited to, an alloy with a metal such as Li, and an alloy with at least one metal selected from the group consisting of Sn, Ge and Al.

By assembling the all-solid-state battery and initially charging the same, the Si is reacted with a metal such as Li to form an amorphous alloy. An alloyed part of the Si is kept amorphized even after metal ions such as lithium ions are released by discharging the battery. In the disclosed embodiments, therefore, the anode layer comprising Si include such an embodiment that the Si is formed into amorphous alloy.

The form of the anode active material is not particularly limited. For example, it may be a particulate form or a thin film form.

The average particle diameter ($D_{50}$) of the anode active material may be 1 nm or more and 100 µm or less, or it may be 10 nm or more and 30 µm or less, for example.

In the disclosed embodiments, the average particle diameter of particles is a value measured by laser diffraction/scattering particle size distribution analysis. Also in the disclosed embodiments, the median diameter ($D_{50}$) is a diameter at which, when the particle diameters of particles are arranged in ascending order, the accumulated volume of the particles is half (50%) the total volume of the particles.

The content of the anode active material in the anode layer is not particularly limited. For example, it may be 40 mass % or more and 100 mass % or less.

As the solid electrolyte, examples include sulfide- and oxide-based solid electrolytes as mentioned above. The solid electrolyte may be amorphous, crystalline or glass ceramic.

The content of the solid electrolyte in the anode layer is not particularly limited.

The binder and electroconductive material used in the anode layer, may be appropriately selected from the above-mentioned examples applicable to the cathode layer.

The contents of the binder and electroconductive material in the anode layer, are not particularly limited.

The thickness of the anode layer is not particularly limited. It can be appropriately determined depending on desired performance.

As the anode current collector, a conventionally-known metal that is usable as a current collector in all-solid-state batteries, can be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the anode current collector is not particularly limited. As the form, examples include, but are not limited to, various kinds of forms such as a foil form and a mesh form.

The whole form of the anode is not particularly limited. It may be a sheet form. In this case, the whole thickness of the anode is not particularly limited. It can be determined depending on desired performance.

The method for forming the anode layer is not particularly limited. As the method, examples include, but are not limited to, pressure-forming a powdered anode mix that contains the anode active material and, as needed, other components.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

As the all-solid-state battery, examples include, but are not limited to, a lithium ion battery, a sodium battery, a magnesium battery and a calcium battery. The all-solid-state battery may be a lithium ion battery.

As the form of the all-solid-state battery, examples include, but are not limited to, a coin form, a laminate form, a cylindrical form and a square form.

3. Method for Producing Cathode

The cathode production method of the disclosed embodiments is a method for producing a cathode comprising a cathode layer for all-solid-state batteries, the method comprising:

preparing cathode active material particles;
vacuum-drying the cathode active material particles at a temperature of 120° C. or more and 300° C. or less for one hour or more;
mixing the cathode active material particles with solid electrolyte particles to obtain a cathode mix; and
forming the cathode mix to obtain the cathode layer, wherein at least one of the cathode active material particles and the solid electrolyte particles contain a phosphorus element, and wherein, in a photoelectron spectrum by a X-ray photoelectron spectroscopy measurement of the cathode layer, a P peak intensity ratio (A/B), which is derived from the phosphorus element, of a signal intensity A at a binding energy of 131.6 eV to a signal intensity B at a binding energy of 133.1 eV, is larger than 0.58.

The cathode production method of the disclosed embodiments comprises at least (1) preparing, (2) vacuum-drying, (3) mixing and (4) forming.

Hereinafter, these steps will be described in order.

(1) Preparing

This is a step of preparing cathode active material particles.

The cathode active material particles will not be described here, since they are the same as those described above under "1. Cathode".

In the preparing, the composite active material particles comprising the cathode active material particles and the lithium ion conducting oxide, the lithium ion conducting oxide coating at least part of the surface of the cathode active material particles, may be prepared as the cathode active material, from the point of view that formation of a resistive layer by reaction between the cathode active material particles and the solid electrolyte particles, can be suppressed. In the disclosed embodiments, the given peak intensity ratio, which is obtained by XPS measurement of the cathode layer, is determined as the measure to judge whether the cathode active material particles contained in the cathode layer and/or the solid electrolyte particles are kept in an unoxidized state or not. Accordingly, as long as the cathode comprising the cathode layer having the peak intensity ratio is obtained, the cathode active material contained in the cathode layer may be the cathode active material particles or composite active material particles.

The lithium ion conducting oxide and the composite active material particles will not be described here, since they are the same as those described above under "1. Cathode".

[Method for Producing Composite Active Material Particles]

The method for producing the composite active material particles may be the following method, for example: by immersing the cathode active material particles in a solution containing an element that will compose the lithium ion conducting oxide, or by spraying the solution to the cathode active material particles while the particles are in a fluidized state, the surface of the cathode active material particles is coated with the solution; the coated particles are dried for removal of the solvent; and the dried particles are appropriately heated, thereby obtaining the composite active material particles.

As the solution, a peroxo complex aqueous solution or an alkoxide solution is used.

In the case of using the peroxo complex aqueous solution, the composite active material particles can be produced by the process as disclosed in Japanese Patent Application Laid-Open (JP-A) No. 2012-74240 or JP-A No. 2016-170973, for example.

In the case of using the alkoxide solution, the composite active material particles can be produced by the process as disclosed in International Publication No. WO2007/004590 or JP-A No. 2015-201252, for example.

In the cathode production method of the disclosed embodiments, therefore, the composite active material particles may be prepared in the preparing through (1-1) drying, on the surface of the cathode active material particles, the peroxo complex aqueous solution containing the element that will compose the lithium ion conducting oxide to obtain the precursor of the composite active material particles, and (1-2) sintering the precursor.

(1-1) Drying

This is a step of drying, on the surface of the cathode active material particles, the peroxo complex aqueous solution containing the element will compose the lithium ion conducting oxide to obtain the precursor of the composite active material particles.

In the drying, accordingly, the cathode active material particles are dried while the peroxo complex aqueous solution is in contact with the surface of the cathode active material particles.

The peroxo complex aqueous solution is brought into contact with the surface of the cathode active material particles by the above-described immersing or spraying. Of them, the peroxo complex aqueous solution may be brought into contact with the particle surface by the spraying.

When lithium niobate is used as the lithium ion conducting oxide, the peroxo complex aqueous solution contains lithium and a peroxo complex of niobium.

More specifically, a clear solution is produced by use of hydrogen peroxide solution, niobic acid and ammonia water, and a lithium compound is added to the clear solution, thereby obtaining the peroxo complex aqueous solution. In this case, the percentage of the moisture content of the niobic acid is not particularly limited, since the peroxo complex of niobium can be produced even if the percentage is changed.

Also, the mixing ratio of the niobic acid and the ammonia water is not particularly limited, as long as the peroxo complex of niobium can be synthesized.

As the lithium compound, examples include, but are not limited to, LiOH, $LiNO_3$ and $Li_2SO_4$. The lithium compound may be a hydrate.

In the drying, after the peroxo complex aqueous solution is brought into contact with the surface of the cathode active material particles, volatile components that are contained in the peroxo complex aqueous solution brought into contact with the surface of the cathode active material particles, such as solvent and hydration water, are removed by drying.

The drying can be carried out by use of a tumbling/fluidizing coating device or a spray dryer, for example.

As the tumbling/fluidizing coating device, examples include, but are not limited to, "MULTIPLEX COATER" (manufactured by Powrex Corporation) and "FLOW COATER" ((manufactured by Freund Corporation).

In the drying, the drying temperature is not particularly limited.

Also in the drying, the atmosphere (carrier gas) is not particularly limited.

(1-2) Sintering

This is a step of sintering the thus-obtained precursor at a given temperature. Accordingly, the composite active material particles in which at least part of the surface of the cathode active material particles is coated with the lithium ion conducting oxide coating, are obtained.

The sintering can be carried out in the air atmosphere, for example.

The sintering temperature may be the same as conventional processes.

(2) Vacuum-Drying

This is a step of vacuum-drying the cathode active material particles at a temperature of 120° C. or more and 300° C. or less for one hour or more.

By the vacuum-drying, moisture can be appropriately removed from the cathode active material particles.

In the disclosed embodiments, "vacuum-drying" means removing moisture from the cathode active material particles by decreasing the atmospheric pressure to 100 kPa or less. The applied pressure may be 50 kPa or less, or it may be 5 kPa or less.

The vacuum-drying can be carried out by use of a non-exposed vacuum dryer, for example. More specifically, it can be carried out by various kinds of methods, such as drying by use of an open vacuum dryer in a glove box, and heating a hermetically sealed system in a furnace while vacuumizing the hermetically sealed system.

In the vacuum-drying, the vacuum-drying temperature may be 120° C. or more, or it may be 200° C. or more. When the vacuum-drying temperature is too low, moisture cannot be efficiently removed from the cathode active material particles.

In the vacuum-drying, the vacuum-drying temperature may be 300° C. or less, or it may be 250° C. or less. When the composite active material particles are prepared in the preparing, if the vacuum-drying temperature is too high, it is possible that crystallization of the lithium ion conducting oxide is promoted, and moisture is produced from the inside of the crystal structure of the lithium ion conducting oxide to increase the moisture content of the cathode active material particles. In addition, when the crystallization of the lithium ion conducting oxide is promoted, it is possible that the resistance of the composite active material particles themselves increases.

In the vacuum-drying, the drying time is 1 hour or more, or it may be 5 hours or more. When the drying time is too long, it is difficult to appropriately remove moisture from the cathode active material particles. The upper limit of the drying time is not particularly limited. For example, it may be 10 hours or less.

(3) Mixing

This is a step of mixing the cathode active material particles with solid electrolyte particles to obtain a cathode mix.

As the solid electrolyte particles, examples include, but are not limited to, oxide-based solid electrolyte particles and sulfide-based solid electrolyte particles. The solid electrolyte particles may be sulfide-based solid electrolyte particles.

The cathode active material particles and the solid electrolyte particles may be dry-mixed, or they may be wet-mixed by use of an organic solvent (such as a non-polar solvent).

In addition to the cathode active material particles and the solid electrolyte particles, the cathode mix may further contain an electroconductive material, a binder, etc.

The solid electrolyte particles, the electroconductive material and the binder will not be described here, since they are the same as those described above under "1. Cathode".

(4) Forming

This is a step of forming the cathode mix to obtain the cathode layer.

The cathode mix may be dry-formed or wet-formed. The cathode mix may be formed alone, or it may be formed in combination with the cathode current collector. Also, the powdered cathode mix and the solid electrolyte layer may be integrally formed on a surface of the solid electrolyte layer.

For the cathode obtained by the production method of the disclosed embodiments, in a photoelectron spectrum by X-ray photoelectron spectroscopy measurement of the cathode layer, the P peak intensity ratio (A/B), which is derived from the phosphorus element, of the signal intensity A at a binding energy of 131.6 eV to the signal intensity B at a binding energy of 133.1 eV, is larger than 0.58.

The ratio (A/B) will not be described here, since it is the same as the ratio (A/B) descried above under "1. Cathode".

4. Method for Producing all-Solid-State Battery

The all-solid-state battery production method of the disclosed embodiments is a method for producing an all-solid-state battery comprising:

a cathode comprising a cathode layer,
an anode comprising an anode layer, and
a solid electrolyte layer disposed between the cathode layer and the anode layer,
wherein the cathode is a cathode produced by the above-described production method.

The method for producing the all-solid-state battery of the disclosed embodiments, is not particularly limited and may be a conventionally-known method.

For example, the solid electrolyte layer is formed by pressure-forming the powdered solid electrolyte material containing the solid electrolyte. Next, the cathode layer is obtained by pressure-forming the powdered cathode mix on one surface of the solid electrolyte layer. Then, the anode layer is obtained by pressure-forming the powdered anode mix on the other surface of the solid electrolyte layer. Then, a cathode layer-solid electrolyte layer-anode layer assembly thus obtained, can be the all-solid-state battery.

In this case, the press pressure applied in the pressure-forming of the powdered solid electrolyte material, the powdered cathode mix and the powdered anode mix, is generally about 1 MPa or more and about 600 MPa or less.

The pressing method is not particularly limited. As the method, examples include, but are not limited to, applying pressure by use of a plate press machine, a roll press machine, etc.

As the method for producing the all-solid-state battery, the powdered cathode mix, the powdered solid electrolyte material and the powdered anode mix may be deposited and integrally formed at a time.

The production of the cathode and the production of the all-solid-state battery may be carried out in the state that moisture is removed from the system as much as possible. For example, it is thought to be effective to depressurize the inside of the system in the production steps and to replace the inside of the system by a substantially moisture-free gas (such as inert gas) in the production steps.

EXAMPLES

Example 1

[Preparation of Peroxo Complex Aqueous Solution]

First, 870.4 g of hydrogen peroxide solution having a concentration of 30 mass % was put into a container. In addition, 987.4 g of ion-exchanged water and 44.2 g of niobic acid ($Nb_2O_5 \cdot 3H_2O$, $Nb_2O_5$ content: 72%) were put into the container. Next, 87.9 g of ammonia water having a concentration of 28 mass % was put into the container, thereby obtaining a mixed solution. The mixed solution was sufficiently stirred, thereby obtaining a clear solution. Next, 10.1 g of lithium hydroxide monohydrate ($LiOH \cdot H_2O$) was added to the clear solution, thereby obtaining a peroxo complex aqueous solution containing lithium and a niobium complex.

For the thus-obtained peroxo complex aqueous solution, the mol concentration of Li was 0.12 mol/kg, and the mol concentration of Nb was 0.12 mol/kg.

[Spraying and Sintering]

By use of a coating device ("MP-01" manufactured by Powrex Corporation), 2840 g of the peroxo complex aqueous solution was sprayed onto 1 kg of cathode active material particles ($LiNi_{1/3}Mn_{1/3}Co_{1/3}O_2$) to attach the peroxo complex aqueous solution to the surface of the cathode active material particles. The attached peroxo complex aqueous solution was dried, thereby obtain a precursor of composite active material particles.

The operation conditions of the coating device were as follows:

Intake air/gas: Nitrogen
Intake air temperature: 120° C.
Intake air flow rate: 0.4 $m^3$/min
Rotor rotation frequency: 400 rpm
Spraying rate: 4.8 g/min The thus-obtained precursor of the composite active material particles was sintered in the air at 200° C. for 5 hours, thereby obtaining composite active material particles before removal of moisture.

[Removal of Moisture]

By use of a glass tube oven (manufactured by Sibata Scientific Technology Ltd.) as a non-exposed vacuum dryer, the composite active material particles were vacuum-dried at 200° C. for 5 hours at 5 kPa or less. Then, the composite active material particles were collected and transferred to the inside of a glove box under an Ar atmosphere (dew point: −70° C. or less) without exposing the particles to the air atmosphere.

[Cathode]

The collected composite active material particles, particles of a sulfide-based solid electrolyte ($Li_3PS_4$), 3 mass % of VGCF (manufactured by Showa Denko K. K.) as an electroconductive material, and 0.7 mass % of butylene rubber (manufactured by JSR Corporation) as a binder, were put into heptane, thereby producing a cathode mix slurry. The proportion of the VGCF and that of the butylene rubber, which are both expressed in mass %, are values when the total mass of a cathode layer is determined as 100 mass %.

The produced slurry was dispersed by an ultrasonic homogenizer. The dispersed slurry was applied onto an aluminum foil as a cathode current collector. The applied slurry was dried at 100° C. for 30 minutes, thereby obtaining a cathode in which the cathode layer was formed on the cathode current collector. Then, the cathode was cut in a size of 1 $cm^2$. The composite active material particles and the sulfide-based solid electrolyte particles in the cathode layer were at a volume ratio of 6:2.

[Anode]

An anode active material (layered carbon), sulfide-based solid electrolyte particles and 1.2 mass % of butylene rubber were put into heptane, thereby producing an anode mix slurry. The proportion of the butylene rubber, which is expressed in mass %, is a value when the total mass of an anode layer is determined as 100 mass %.

The produced slurry was dispersed by the ultrasonic homogenizer. The dispersed slurry was applied onto a copper foil as an anode current collector. The applied slurry was dried at 100° C. for 30 minutes, thereby obtaining an anode in which the anode layer was formed on the anode current collector. Then, the anode was cut in a size of 1 $cm^2$. The anode active material particles and the sulfide-based solid electrolyte particles in the anode layer were at a volume ratio of 6:4.

[Solid Electrolyte Layer]

First, 64.8 mg of a sulfide-based solid electrolyte was put into a ceramic tube having an inner diameter cross-sectional area of 1 $cm^2$. The sulfide-based solid electrolyte was leveled off and then pressed at 1 ton/$cm^2$ (~98 MPa), thereby producing a solid electrolyte layer.

[All-Solid-State Battery]

The cathode was disposed on one surface of the solid electrolyte layer, and the anode was disposed on the other surface of the solid electrolyte layer, thereby obtaining a stack. After the stack was pressed at 4.3 ton/$cm^2$ for one minute, a stainless rod is inserted in the cathode, and another stainless rod was inserted in the anode. The stack was confined at 1 ton/$cm^2$ (~98 MPa), thereby producing an all-solid-state battery.

Comparative Example 1

A cathode and an all-solid-state battery were obtained in the same manner as Example 1, except that the above-mentioned "Removal of moisture" was not carried out, and composite active material particles before removal of moisture were used in the above-described "Cathode".

[Measurement of Internal Resistance of all-Solid-State Batteries]

The all-solid-state battery of Example 1 was charged to a voltage of 4.37 V and then discharged to 3.0 V. Next, the internal resistance (initial internal resistance) during the initial discharging of the all-solid-state battery when the battery voltage was 3.95 V, was measured by an AC impedance method. The internal resistance (initial internal resistance) of the all-solid-state battery of Comparative Example 1 was measured in the same manner as Example 1. The measurement results are shown in Table 1.

Then, a durability test was carried out as follows: the voltage of each all-solid-state battery was controlled to 4.1 V, and each all-solid-state battery was stored in an environment controlled at 60° C. for 28 days.

Then, the internal resistance of each all-solid-state battery after the durability test, was measured by the AC impedance method when the battery voltage was 3.95 V. The measurement results are shown in Table 1. In the disclosed embodiments, the internal resistance means the sum of DC resistance, reaction resistance, diffusion resistance and other resistances.

[Measurement of Moisture Content of Composite Active Material Particles]

The moisture content of the composite active material particles of Example 1 and that of the composite active material particles of Comparative Example 1, were measured by the Karl Fischer titration method.

More specifically, the moisture content measurement was carried out as follows. A coulometric Karl Fischer titrator (manufactured by Hiranuma Sangyo Co., Ltd.) was used for the measurement. The composite active material particles were placed in the heating member of the titrator, which was controlled at 200° C., thereby releasing moisture from the composite active material particles. The released moisture was measured by allowing nitrogen gas, which was used as a carrier, to flow into the measuring member of the titrator. The measurement time was 40 minutes. The measurement results are shown in Table 1.

[XPS Measurement of Cathode Layer]

After the all-solid-state battery of Example 1 was initially charged, the initially charged all-solid-state battery was disassembled; the cathode was taken out; and the aluminum foil was removed from the cathode, thereby obtaining the cathode layer. XPS measurement was directly carried out on the cathode layer. For the cathode layer, the narrow-range photoelectron spectrum of the phosphorus element was measured by use of "QUANTERA" (manufactured by ULVAC-PHI, Inc.) in the following conditions:

X-ray output: 25 W
X-ray beam size: 100 μm Φ
X-ray take-off angle: 45 degrees

For the all-solid-state battery of Comparative Example 1, the XPS measurement of the cathode layer and the measurement of the narrow-range photoelectron spectrum of the phosphorus element, were carried out in the same manner as Example 1.

Figure 2:
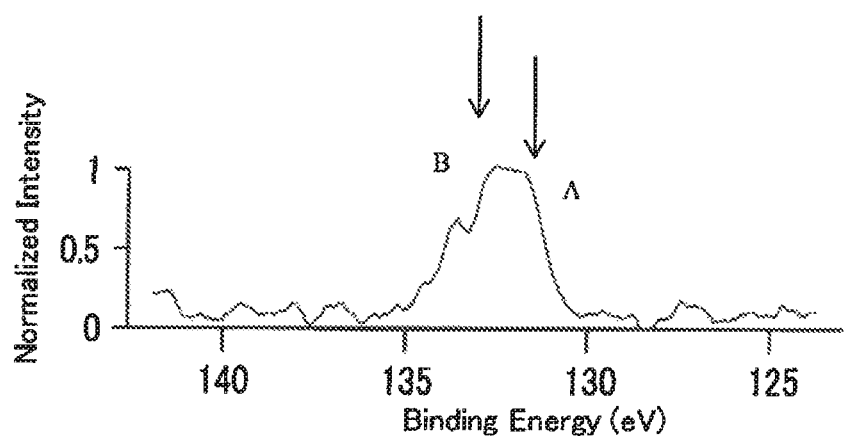
FIG. 2 shows a photoelectron spectrum of Example 1.
Figure 3:
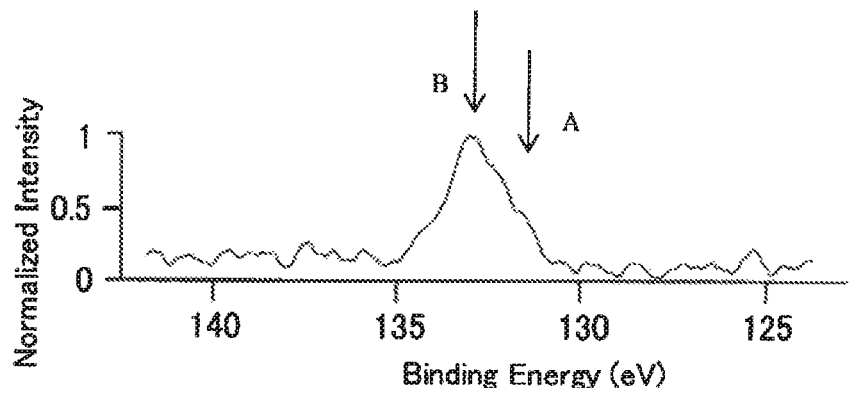
FIG. 3 shows a photoelectron spectrum of Comparative Example 1.

FIG. 2 shows the photoelectron spectrum of Example 1.
FIG. 3 shows the photoelectron spectrum of Comparative Example 1.

From the thus-obtained photoelectron spectra, the P peak intensity ratio of Example 1 and that of Comparative Example 1 were calculated. The results are shown in Table 1.

TABLE 1

| | Moisture content (ppm) | Initial internal resistance (Ω) | Internal resistance (Ω) after durability test | P peak intensity ratio |
|---|---|---|---|---|
| Example 1 | 70 | 15.6 | 19.1 | 1.55 |
| Comparative Example 1 | 402 | 17.2 | 21 | 0.58 |

[Evaluation Result]

As shown in Table 1, the peak intensity ratio of the cathode layer of Example 1 is larger than that of the cathode layer of Comparative Example 1.

For the composite active material particles of Example 1 in which the removal of the moisture was carried out by vacuum-drying, it was revealed that the moisture content was remarkably decreased compared to the composite active material particles of Comparative Example 1 in which the removal of the moisture was not carried out.

For the all-solid-state battery of Example 1, it was revealed that the internal resistance was remarkably decreased compared to the all-solid-state battery of Comparative Example 1.

The effect exerted by the vacuum-drying is considered as follows. By significantly removing the moisture contained in the composite active material particles, in the all-solid-state battery, reaction between the moisture contained in the composite active material particles and the sulfide-based solid electrolyte being in contact with the composite active material particles, was suppressed, and oxidation of the sulfide-based solid electrolyte was suppressed. Accordingly, it is thought that the conductivity of the sulfide-based solid electrolyte was kept high and, as a result, the battery resistance of the all-solid-state battery was decreased.

Therefore, it was proved that the internal resistance of the all-solid-state battery comprising the cathode layer can be decreased when, as described above, in a photoelectron spectrum by X-ray photoelectron spectroscopy measurement of the cathode layer, the P peak intensity ratio (A/B), which is derived from the phosphorus element, of the signal intensity A at a binding energy of 131.6 eV to the signal intensity B at a binding energy of 133.1 eV, is larger than 0.58.

REFERENCE SIGNS LIST

11. Solid electrolyte layer
12. Cathode layer
13. Anode layer
14. Cathode current collector
15. Anode current collector
16. Cathode
17. Anode
100. All-solid-state battery

The invention claimed is:

1. A method for producing an electric vehicle comprising an all-solid-state battery,
wherein the all-solid-state battery comprises a cathode comprising a cathode layer, an anode comprising an anode layer, and a solid electrolyte layer disposed between the cathode layer and the anode layer,
the method comprising:
preparing cathode active material particles;
vacuum-drying the cathode active material particles at a temperature of 120° C. or more and 300° C. or less for one hour or more;
mixing the cathode active material particles with solid electrolyte particles to obtain a cathode mix; and
forming the cathode mix to obtain the cathode layer,
wherein at least one of the cathode active material particles and the solid electrolyte particles contain a phosphorus element, and
wherein, in a photoelectron spectrum by a X-ray photoelectron spectroscopy measurement of the cathode layer, a P peak intensity ratio (A/B), which is derived from the phosphorus element, of a signal intensity A at a binding energy of 131.6 eV to a signal intensity B at a binding energy of 133.1 eV, is larger than 0.58.

2. The method for producing the electric vehicle according to claim 1, wherein, in the preparing, composite active material particles comprising the cathode active material particles and a lithium ion conducting oxide, the lithium ion conducting oxide coating at least part of the surface of the cathode active material particles, are prepared.

3. The method for producing the electric vehicle according to claim 2, wherein, in the preparing, a precursor of the composite active material particles is obtained by drying, on the surface of the cathode active material particles, a peroxo complex aqueous solution containing an element that will compose the lithium ion conducting oxide, and the composite active material particles are obtained by sintering the precursor.

4. The method for producing the electric vehicle according to claim 1, wherein the solid electrolyte particles are sulfide-based solid electrolyte particles.

* * * * *